(12) United States Patent
Savian

(10) Patent No.: US 11,958,610 B2
(45) Date of Patent: Apr. 16, 2024

(54) RECONFIGURABLE AIRCRAFT GALLEY MONUMENT

(71) Applicant: SAFRAN CABIN INC., Huntington Beach, CA (US)

(72) Inventor: Scott Savian, Huntington Beach, CA (US)

(73) Assignee: Safran Cabin Inc., Huntington Beach, CA (US)

(*) Notice: Subject to any disclaimer, the term of this patent is extended or adjusted under 35 U.S.C. 154(b) by 396 days.

(21) Appl. No.: 17/289,686

(22) PCT Filed: Nov. 6, 2019

(86) PCT No.: PCT/US2019/060092
§ 371 (c)(1),
(2) Date: Apr. 28, 2021

(87) PCT Pub. No.: WO2020/097219
PCT Pub. Date: May 14, 2020

(65) Prior Publication Data
US 2021/0403166 A1    Dec. 30, 2021

Related U.S. Application Data

(60) Provisional application No. 62/756,219, filed on Nov. 6, 2018.

(51) Int. Cl.
*B64D 11/04* (2006.01)
*B64D 11/00* (2006.01)

(52) U.S. Cl.
CPC .......... *B64D 11/04* (2013.01); *B64D 11/0007* (2013.01)

(58) Field of Classification Search
CPC ..... B64D 11/04; B64D 11/0007; B64D 11/00; B64D 2011/0046; Y02T 50/40
See application file for complete search history.

(56) References Cited

U.S. PATENT DOCUMENTS

| | | | | |
|---|---|---|---|---|
| 2,580,334 A | * | 12/1951 | Vanderveld | A47B 47/00 312/111 |
| 4,055,317 A | * | 10/1977 | Greiss | B64D 11/00 244/119 |
| 4,079,904 A | * | 3/1978 | Groskopfs | B64G 1/14 414/283 |
| 6,323,782 B1 | * | 11/2001 | Stephens | G07C 9/00571 340/5.73 |

(Continued)

FOREIGN PATENT DOCUMENTS

| | | |
|---|---|---|
| CN | 104185594 A | 12/2014 |
| CN | 105501446 A | 4/2016 |

(Continued)

OTHER PUBLICATIONS

Extended Search Report issued in European Appl. 19881803.01.

(Continued)

*Primary Examiner* — Medhat Badawi
(74) *Attorney, Agent, or Firm* — Kilpatrick Townsend & Stockton LLP

(57) ABSTRACT

A system and method for replacing or retrofitting aircraft galley monuments that include standard inserts therein with monuments that include at least some spaces for larger non-standard inserts.

9 Claims, 4 Drawing Sheets

(56) References Cited

U.S. PATENT DOCUMENTS

| | | | | |
|---|---|---|---|---|
| 6,761,332 B1* | 7/2004 | Bengtsson | B64D 11/04 | 244/119 |
| 7,780,114 B2* | 8/2010 | Doebertin | B64D 11/04 | 244/118.5 |
| 8,387,916 B2* | 3/2013 | Baatz | B64D 11/0007 | 312/201 |
| 8,519,824 B1* | 8/2013 | Rankin | B64D 11/00 | 244/118.5 |
| 9,038,945 B2* | 5/2015 | Godecker | B64D 11/0007 | 312/201 |
| 9,284,054 B2* | 3/2016 | Saint-Jalmes | B64D 11/00 | |
| 9,359,078 B2* | 6/2016 | Burd | B64D 11/0015 | |
| 9,399,516 B2* | 7/2016 | Hawkins | B64D 11/04 | |
| 9,499,272 B2* | 11/2016 | Kearsey | A47B 46/005 | |
| 10,875,649 B2* | 12/2020 | Brown | B64D 11/04 | |
| 11,492,120 B2* | 11/2022 | Burd | B32B 5/26 | |
| 2004/0057177 A1* | 3/2004 | Glahn | H02J 3/14 | 361/62 |
| 2004/0075533 A1* | 4/2004 | Ives | G11B 33/124 | 340/5.73 |
| 2005/0023413 A1* | 2/2005 | Saint-Jalmes | B64D 11/0641 | 244/118.6 |
| 2005/0121978 A1* | 6/2005 | McAvoy | H02J 3/14 | 307/43 |
| 2006/0145002 A1* | 7/2006 | Van Loon | A47B 51/00 | 312/247 |
| 2007/0215433 A1* | 9/2007 | Logan | G07F 11/007 | 194/209 |
| 2007/0228216 A1* | 10/2007 | Wenstrom | B64D 11/04 | 244/118.5 |
| 2008/0001031 A1* | 1/2008 | Doebertin | B64D 11/04 | 244/118.1 |
| 2009/0314889 A1* | 12/2009 | Baatz | B64D 11/0007 | 244/118.5 |
| 2012/0085862 A1* | 4/2012 | Pangalila | B64D 11/04 | 29/428 |
| 2013/0256249 A1* | 10/2013 | Burd | B64D 11/0015 | 211/153 |
| 2014/0152027 A1* | 6/2014 | Burd | E05C 19/028 | 292/200 |
| 2014/0238064 A1* | 8/2014 | Hawkins | B64D 11/04 | 62/244 |
| 2014/0367516 A1* | 12/2014 | Lange | B65D 90/0073 | 414/630 |
| 2015/0059385 A1* | 3/2015 | Burd | F25D 15/00 | 62/412 |
| 2016/0101866 A1* | 4/2016 | Sieben | B64C 1/1423 | 244/118.5 |
| 2016/0264246 A1* | 9/2016 | Young | B64D 11/04 | |
| 2016/0311534 A1* | 10/2016 | Nojiri | B64D 11/04 | |
| 2018/0016010 A1* | 1/2018 | Benthien | B64C 1/061 | |
| 2018/0072425 A1* | 3/2018 | Weifenbach | B64D 11/0007 | |
| 2019/0002105 A1* | 1/2019 | Moran | B64D 11/0007 | |
| 2019/0375508 A1* | 12/2019 | Schalla | B64D 11/04 | |
| 2019/0389598 A1* | 12/2019 | Chua | B64D 11/00 | |
| 2020/0115057 A1* | 4/2020 | Chylinski | B64D 11/04 | |
| 2021/0403166 A1* | 12/2021 | Savian | B64D 11/0007 | |

FOREIGN PATENT DOCUMENTS

| | | |
|---|---|---|
| EP | 1986914 A1 | 11/2008 |
| EP | 3275785 B1 | 9/2018 |
| WO | 2018093382 A1 | 5/2018 |

OTHER PUBLICATIONS

Extended Search Report issued in EP22185522.4.
China Patent Application No. 201980072969.0, Office Action, Oct. 18, 2023.

* cited by examiner

RECONFIGURABLE AIRCRAFT GALLEY MONUMENT

CROSS REFERENCE TO RELATED APPLICATIONS

This application is a national stage application, filed under 35 U.S.C. § 371, of International Patent Application No. PCT/US19/60092 filed Nov. 6, 2019, which claims the benefit of U.S. Provisional Application No. 62/756,219, filed Nov. 6, 2018, the entireties of which are incorporated herein by reference.

FIELD OF THE INVENTION

The present invention relates generally to aircraft galley monuments and more particularly to an aircraft galley monument that can be reconfigured.

BACKGROUND OF THE INVENTION

Commercial aircraft, such as the Airbus A320 or Boeing 737 are typically constructed from modular components, the size, weight and construction of which are dictated by many considerations; including fuselage dimensions, aesthetics and safety. Many of these requirements are imposed by law or regulation. Aircraft components, such as overhead stowage compartments, seats, lavatories, galleys, lighting systems, etc. are all required to function within strictly confined spaces.

Manufacturers of aircraft are constantly refining interior aircraft designs to achieve more comfort and utility for passengers and crew within carrier-imposed restraints on cost, weight, maintenance down-time, and safety. Commercial passenger aircraft generally include galleys for use by the crew for storing food and the like.

Galley monuments include standard sized spaces therein for receiving standard sized components (e.g., coffee makers, ovens, etc.), referred to as standard units. However, the standardization limits the amount of usable space within the galley.

SUMMARY OF THE PREFERRED EMBODIMENTS

In accordance with a first aspect of the present invention there is provided a method that includes providing or obtaining a galley monument assembly that includes an outer wall and at least first and second standard insert spaces defined therein. The first standard insert space is defined between a first vertical divider and a second vertical divider and the second standard insert space is defined between the second vertical divider and a third vertical divider. The method includes removing a first standard insert from the first standard insert space, and removing a second standard insert from the second standard insert space. The first standard insert space defines a first width and the second standard insert space defines a second width. The method also includes removing the second vertical divider, thereby defining a first non-standard insert space that defines a third width between the first and third vertical dividers, and inserting a first non-standard insert into the first non-standard insert space. In a preferred embodiment, the second vertical divider defines a fourth width and the third width is approximately equal to the first width plus the second width plus the fourth width.

In a preferred embodiment, the first standard insert includes a first volume therein, the second standard insert includes a second volume therein, the first non-standard insert includes a third volume therein and the third volume is equal to or greater than the first volume plus the second volume.

In a preferred embodiment, the method includes removing the first non-standard insert from the first non-standard insert space, inserting the second vertical divider between the first vertical divider and the third vertical divider to redefine the first and second standard insert spaces, inserting the first standard insert into the first standard insert space, and inserting the second standard insert into the second standard insert space. Preferably, the first standard insert is a first standard electrical insert that includes a first standard insert electrical connector that connects to a first monument electrical connector and the second standard insert is a second standard electrical insert that includes a second standard insert electrical connector that connects to a second monument electrical connector. The first non-standard insert is a first non-standard electrical insert that includes a first non-standard insert electrical connector that when inserted into the monument assembly connects to one of the first or second monument electrical connectors. Preferably, the first width and the second width are approximately the same.

In accordance with a first aspect of the present invention there is provided a method that includes removing a first galley monument assembly from an aircraft interior and replacing it with a second galley monument assembly. The first galley monument assembly includes a first outer wall and at least first and second standard insert spaces defined therein. The first standard insert space is defined between a first vertical divider and a second vertical divider and the second standard insert space is defined between the second vertical divider and a third vertical divider. The first standard insert space defines a first width and the second standard insert space defines a second width. The second galley monument assembly includes a second outer wall and at least a first non-standard insert space defined therein. The first outer wall and the second outer wall have approximately the same dimensions. The first non-standard insert space is defined in the second galley monument in the same location as the first and second standard insert spaces in the first galley monument. The first and second galley monument assemblies also have approximately the same footprints. It will be appreciated that the first and second monument assemblies have almost the same dimensions, but the first monument assembly only accepts standard inserts and the second monument assembly can also accept non-standard inserts in positions where the first monument assembly included multiple standard inserts.

In a preferred embodiment, the present invention creates efficient features by adding to the standard electrical and standard storage insert sizes (e.g., for coffee makers, ovens, containers and other galley features) and creates the ability to use a new set of different sized modules that fit into the configurable spaces or flex zones. These configurable or changeable spaces allow components of different sizes to fit into a standard sized galley monument structure. The present invention allows reconfiguring within the flex zones quickly and efficiently.

To take further advantage of the flex zones, the present invention includes a series of modules based on the size of the flex zone, and not the standard insert sizes (but that can be used with or in addition to standard inserts). This enables efficient use of the space within the basic modular system. One of the keys to the invention that the galley monument assembly enables both current standards and the new sizes interchangeably with forward and backward modular compatibility, while unlocking new space/weight/features advances.

It will be appreciated by those of ordinary skill in the art that aircraft galleys have compartments that have dimensions according to standards, e.g., see https://www.aviation-ia.com/content/arinc-standards, and the ARINC standards set forth therein, the entirety of which is incorporated herein by reference. Standard electrical inserts (e.g. coffee makers, ovens, coolers, etc.) are sized to fit in these standardized galley compartments. Standard units, which are standardized storage containers (and are not electrical) also include standard sizing. Different standard inserts have a standard width and a standard height. For example, under the ARINC standards discussed above, coffee makers have a standard width and a standard height, ovens have a standard width and a standard height, coolers have a standard width and a standard height, storage units have a standard width and a standard height, beverage makers have a standard width and a standard height, etc.

The present invention provides new galley compartment dimensions that enable a number of electrical or storage inserts of the same type (e.g., ovens, beverage makers) to be combined into one, larger insert (e.g. two currently standard size ovens into one newly sized oven, or three currently standard size beverage makers into one newly sized beverage maker). By doing this the dividers that are positioned between the standard sized inserts can be removed or eliminated. The inside volume of a single larger or non-standard insert is also larger than the inside volume of the multiple standard inserts. Therefore, space efficiency is improved compared to the prior art. As will be appreciated by those of ordinary skill in the art, any space efficiency improvement over the prior art is significant within the limited space of an aircraft galley. In other words more capacity in the same envelope (more casseroles in the newly sized oven, than the number of casseroles in two currently sized ovens) or a smaller galley envelope needed to offer the same electrical inserts capacity.

The galley compartment sizing is also backward and forward compatible. "Backward" meaning that a newly sized galley compartment to support the bigger electrical insert can be reverted back into the currently standard galley compartments with the currently standard size electrical inserts. "Forward" meaning that a galley with current sized galley compartments and electrical insert dimensions can be changed to allow the larger sized compartments and electrical inserts.

Combining several standard inserts into a larger one has a number of additional advantages, including cost and weight savings (e.g., because of having a single control unit instead of several control units) and reliability (e.g. by locating the control unit with heat vulnerable electronic components further away from the oven compartment that is a heat source).

BRIEF DESCRIPTION OF THE DRAWINGS

The invention may be more readily understood by referring to the accompanying drawings in which.

Like numerals refer to like parts throughout the several views of the drawings.

DETAILED DESCRIPTION OF THE PREFERRED EMBODIMENTS

Figure 1:
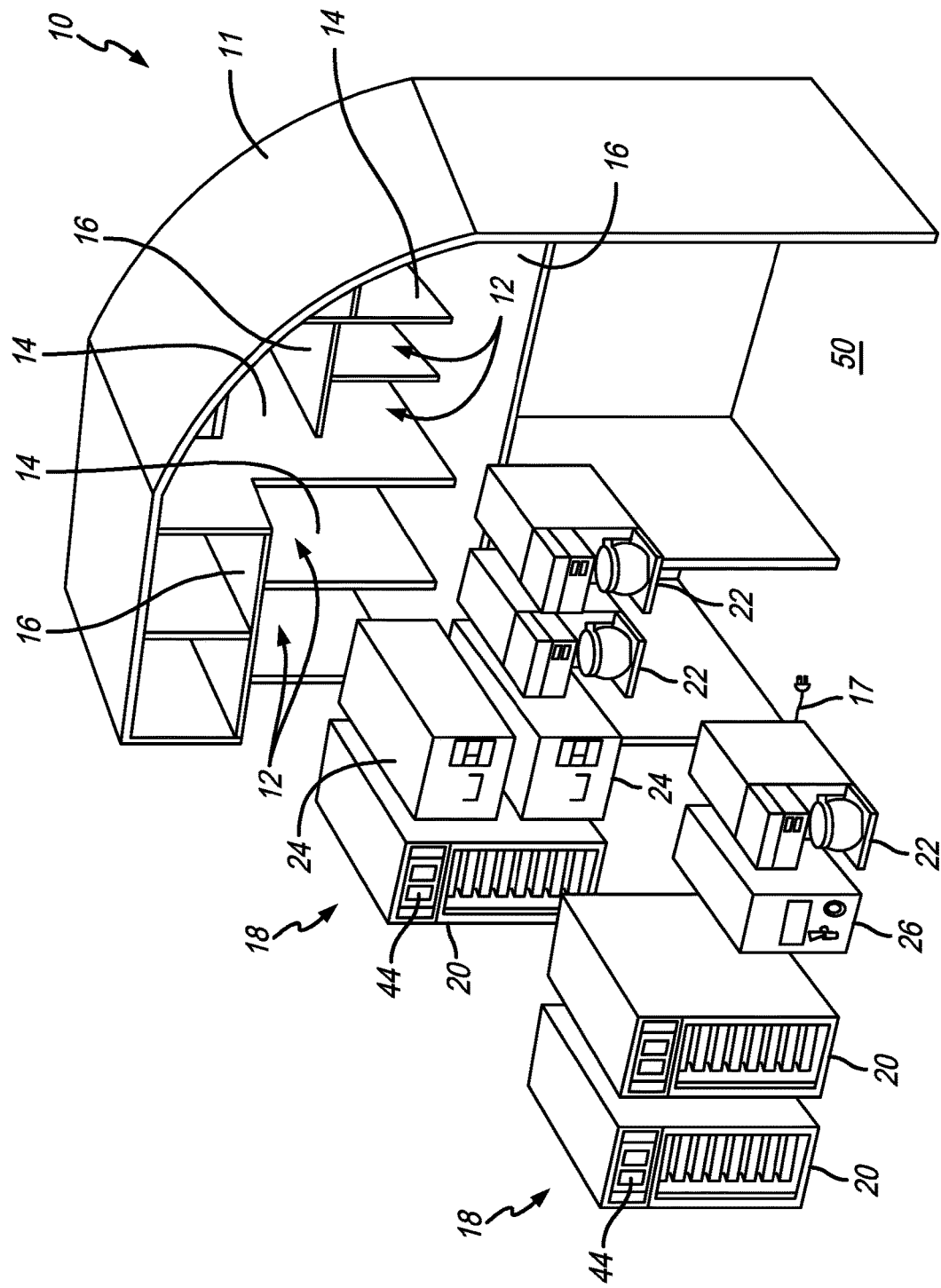
FIG. 1 is a perspective view of a first galley monument assembly that includes a plurality of standard insert spaces therein and also shows a plurality of standard inserts exploded therefrom.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are references to the same embodiment; and, such references mean at least one of the embodiments.

Reference in this specification to "one embodiment" or "an embodiment" means that a particular feature, structure, or characteristic described in connection with the embodiment is included in at least one embodiment of the—disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks: The use of highlighting has no influence on the scope and meaning of a term; the scope and meaning of a term is the same, in the same context, whether or not it is highlighted.

It will be appreciated that the same thing can be said in more than one way. Consequently, alternative language and synonyms may be used for any one or more of the terms discussed herein. No special significance is to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

It will be appreciated that terms such as "front," "back," "top," "bottom," "side," "short," "long," "up," "down," "aft," "forward," "inboard," "outboard" and "below" used herein are merely for ease of description and refer to the orientation of the components as shown in the figures. It should be understood that any orientation of the components described herein is within the scope of the present invention.

Figure 2:
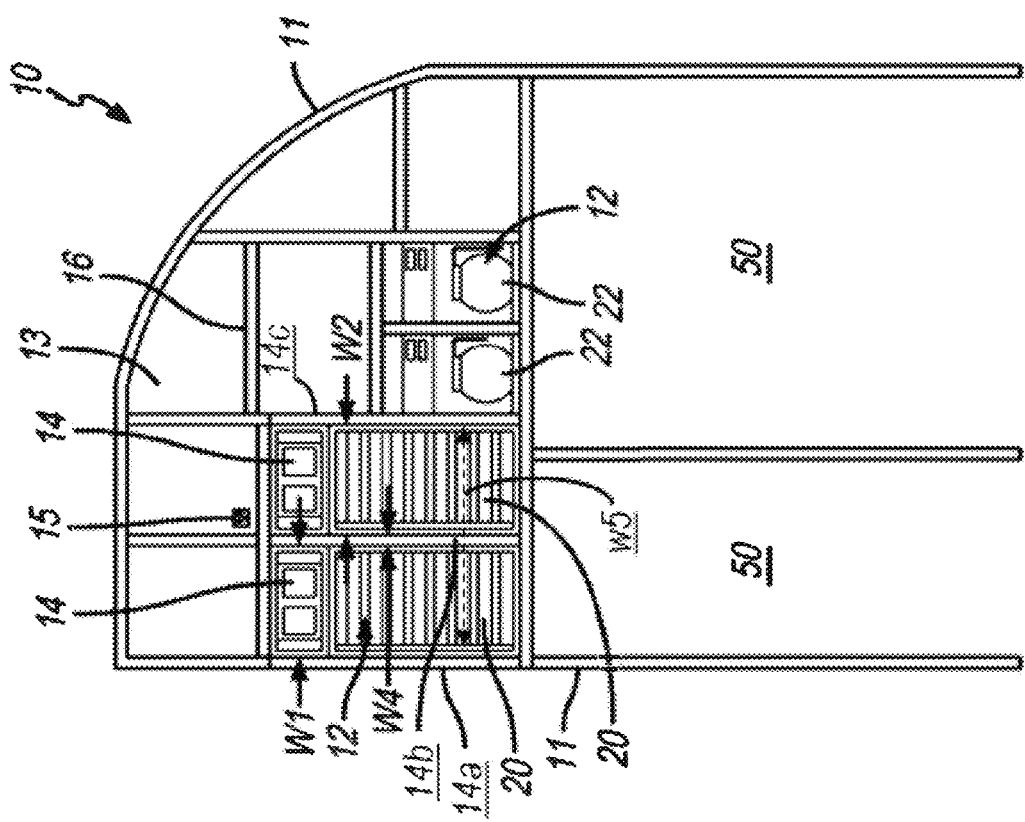
FIG. 2 is a front elevational view of the first galley monument assembly with a plurality of standard inserts therein.

Referring now to the drawings, wherein the showings are for purposes of illustrating the present invention and not for purposes of limiting the same, the figures show an aircraft galley monument system in accordance with a preferred embodiment of the present invention. FIGS. 1-2 show a first galley monument assembly 10 that includes an outer wall 11, a rear wall 13, a plurality of standard insert spaces 12 that are formed by a plurality of vertical dividers 14 and horizontal dividers 16. For example, as shown in FIG. 2, the plurality of vertical dividers 14 can include a first vertical divider 14a, a second vertical divider 14b, a third vertical divider 14c. Each of the standard insert spaces 12 include a width, that allows a standard insert 18 to be inserted therein. FIG. 1 shows, e.g., standard ovens 20, standard coffee makers 22, standard storage units 24 and a standard beverage maker 26. As discussed above, the ARINC standards, coffee makers have a standard width and a standard height, ovens have a standard width and a standard height, coolers have a standard, width and a standard height, storage units have a standard width and a standard height, beverage makers have a standard width and a standard height, etc. The standard, widths shown in FIG. 2 are therefore not necessarily the same width, but represent the standard width to receive whatever standard insert is to be received in that space. In FIG. 2, the standard widths on the right represent the widths for receiving two standard coffee makers 22 and the standard widths (labeled W1 and W2) on the left represent the widths for receiving two standard ovens 20.

Many of the standard units require electrical power and/or water and drainage connections that mate with complementary connections on the standard inserts 18. For example, see the exemplary standard insert electrical connector 17 in FIG. 1 and the monument electrical connector 15 in FIG. 2. The first galley monument assembly 10 includes the required connections within the standard insert spaces 12. It will be appreciated that any type of electrical connection is possible and the male and female connectors are reversible.

Figure 3:
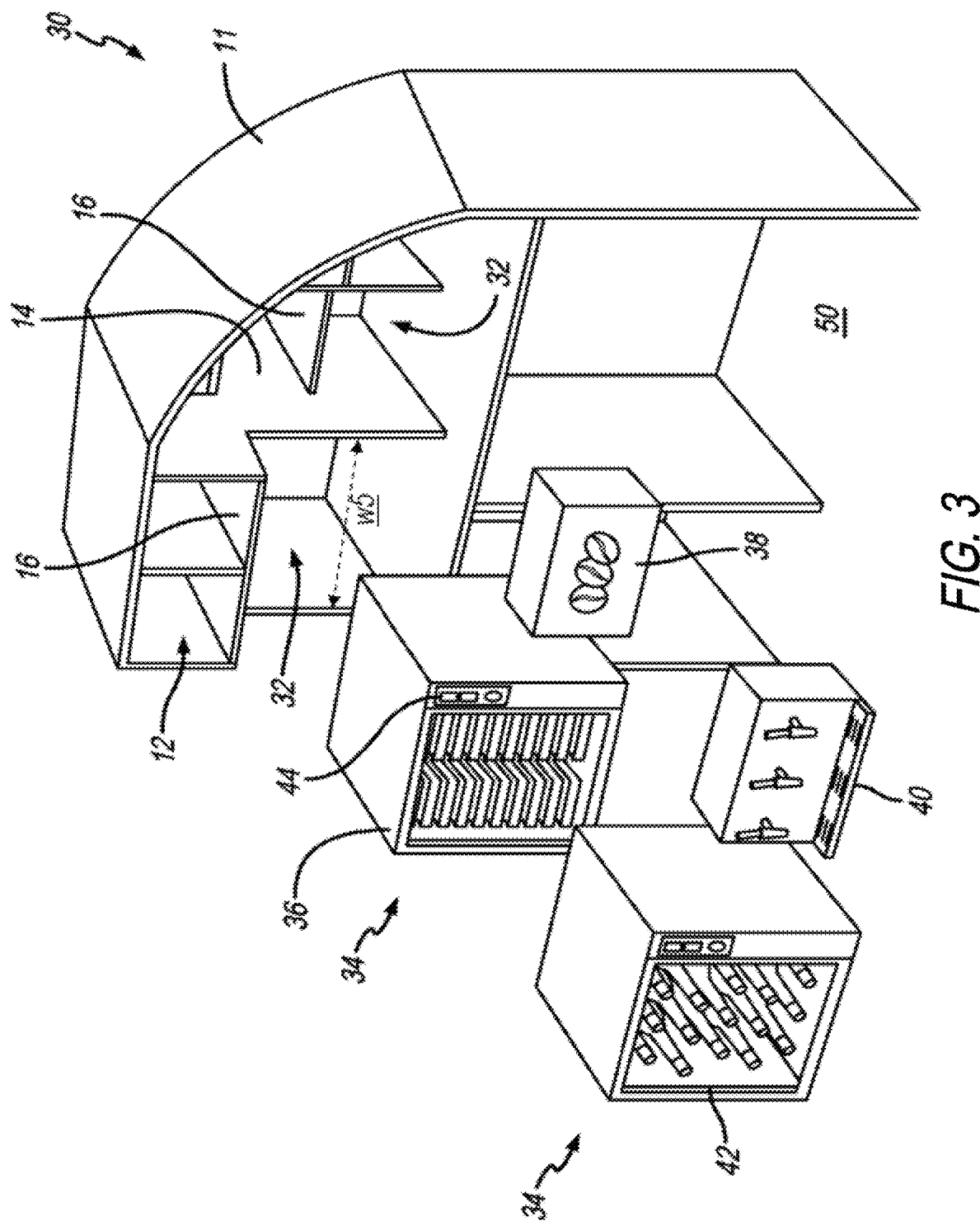
FIG. 3 is a perspective view of a second galley monument assembly that includes a plurality of non-standard insert spaces therein and also shows a plurality of non-standard inserts exploded therefrom.
Figure 4:
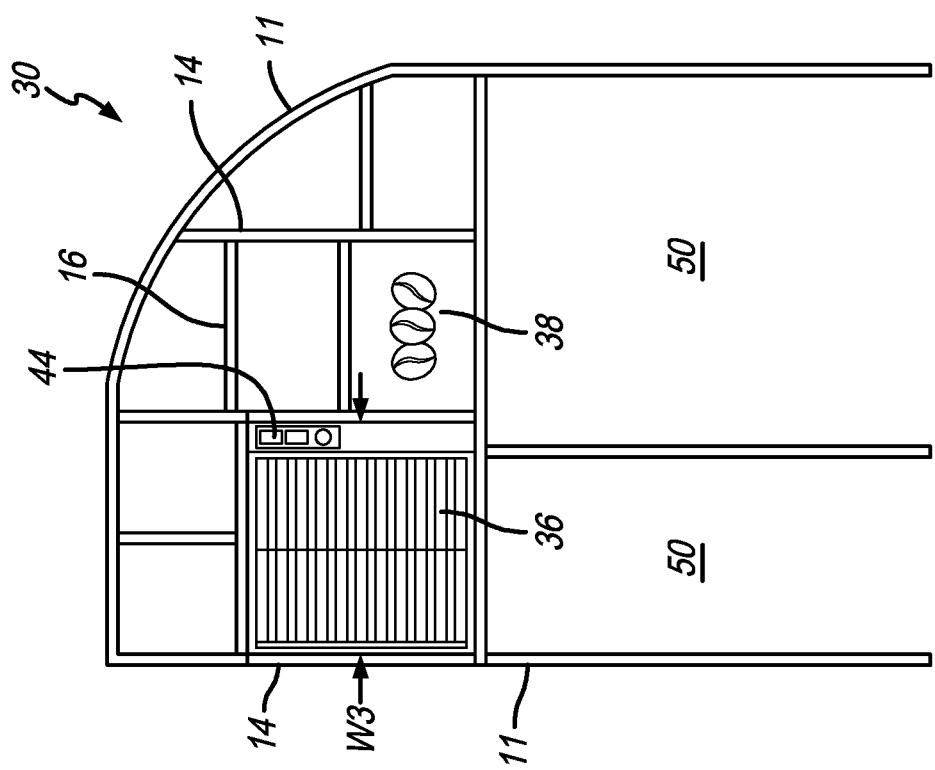
FIG. 4 is a front elevational view of the second galley monument assembly with a plurality of non-standard inserts therein.

FIGS. 3-4 show a second galley monument assembly 30 that includes an outer wall 11, a plurality of non-standard insert spaces 32 that are formed by a plurality of vertical dividers 14 and horizontal dividers 16. Each of the non-standard insert spaces 32 includes a width that is larger than the widths of the standard insert spaces, which allows a non-standard insert 34 to be inserted therein. The second galley monument assembly 30 may also include a plurality of standard insert spaces 12. Any combination of standard insert spaces 12 and non-standard insert spaces 32 is within the scope of the present invention. FIG. 3 shows, e.g., a non-standard oven 36, a non-standard coffee maker 38, a non-standard beverage maker 40, an a non-standard cooler 42. In FIG. 4, the non-standard width on the right represents the width for receiving a non-standard coffee maker 38 and the non-standard width (labeled W3) on the left represents the width for receiving a non-standard oven 36. In comparing FIG. 2 and FIG. 4 it should be appreciated that W1 and W2 represent the widths of two standard insert spaces, W4 represents the width or thickness of the vertical divider between W1 and W2 and W3 represents the width of the non-standard insert space, which is approximately W1 plus W2 plus W4.

It should be understood that the second galley monument assembly 20 is not necessarily a completely new monument, but can be a modification to the first galley monument assembly 10 and can include removing one or more vertical dividers 14 or vertical divider sections. In another embodiment, the first and second galley monuments are completely different monuments. To convert back to a first galley monument assembly with only space for standard inserts, the associated vertical dividers can be inserted into the non-standard insert space 32 to define two standard insert spaces 12. For example, slots can be defined in horizontal dividers to receive the upper and lower edges of the vertical divider 14 to secure the vertical divider in place.

In an embodiment where the first and second galley monument assemblies 10 and 30 are backwards and forwards compatible, the non-standard insert space includes electrical and/or water or drainage connections for when the space is converted to multiple standard insert spaces. The non-standard insert 34 preferably has the includes electrical and/or water or drainage connections positioned thereon so that it can connect with one of the standard includes electrical and/or water or drainage connections. In an embodiment, where the first and second galley monument assemblies 10 and 30 are separate, the second galley monument assembly only includes a single connection for the electrical and/or water or drainage connections for the non-standard insert 34.

It will appreciated that by switching from first galley monument assembly 10 to second galley monument assembly 20 and combining electrical inserts (e.g., from two ovens to one oven) the amount of controls can be reduced. As shown in FIG. 1, the two standard ovens 20 each include a controller 44. However, in FIG. 3, the single non-standard oven 36 includes one controller 44. The elimination of a controller can provide more space in the non-standard oven (when compared to two standard ovens) and less maintenance, among other advantages. The reduction of walls when combining two or more standard ovens into a single oven also provides for further space or volume inside the oven.

Preferably, both the first and second galley monument assemblies include storage space for carts (referred to herein as cart storage space 50). Standard quarter-turn locking mechanisms can be used to secure trolley carts in the cart storage space 50.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description of the Preferred Embodiments using the singular or plural number may also include the plural or singular number respectively. The word "or" in reference to a list of two or more items, covers all of the following interpretations of the word: any of the items in the list, all of the items in the list, and any combination of the items in the list.

The above-detailed description of embodiments of the disclosure is not intended to be exhaustive or to limit the teachings to the precise form disclosed above. While specific embodiments of and examples for the disclosure are described above for illustrative purposes, various equivalent modifications are possible within the scope of the disclosure, as those skilled in the relevant art will recognize. Further, any specific numbers noted herein are only examples: alternative implementations may employ differing values, measurements or ranges. Moreover, terms of degree, such as approximately, substantially and about are used in the claims to prevent a third party from avoiding infringement of any resulting patent by altering a measurement slightly.

The teachings of the disclosure provided herein can be applied to other systems, not necessarily the system described above. The elements and acts of the various embodiments described above can be combined to provide further embodiments. Any measurements described or used herein are merely exemplary and not a limitation on the present invention. Other measurements can be used. Further, any specific materials noted herein are only examples: alternative implementations may employ differing materials.

Any patents and applications and other references noted above, including any that may be listed in accompanying filing papers, are incorporated herein by reference in their entirety. Aspects of the disclosure can be modified, if necessary, to employ the systems, functions, and concepts of the various references described above to provide yet further embodiments of the disclosure.

These and other changes can be made to the disclosure in light of the above Detailed Description of the Preferred Embodiments. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features or aspects of the disclosure with which that terminology is associated. In general, the terms used in the following claims should not be construed to limit the disclosures to the specific embodiments disclosed in the specification unless the above Detailed Description of the Preferred Embodiments section explicitly defines such terms. Accordingly, the actual scope of the disclosure encompasses not only the disclosed embodiments, but also all equivalent ways of practicing or implementing the disclosure under the claims.

Accordingly, although exemplary embodiments of the invention have been shown and described, it is to be understood that all the terms used herein are descriptive rather than limiting, and that many changes, modifications, and substitutions may be made by one having ordinary skill in the art without departing from the spirit and scope of the invention.

What is claimed is:

1. A method comprising the steps of:
   providing a galley monument assembly that includes an outer wall and at least first and second standard insert spaces, wherein the first standard insert space is defined between a first vertical divider and a second vertical divider, wherein the second standard insert space is defined between the second vertical divider and a third vertical divider, wherein each of the first and the second standard insert space satisfy size requirements mentioned in ARINC standards, wherein the second vertical divider has a thickness,
   removing a first standard insert from the first standard insert space, wherein the first standard insert space defines a first width,
   removing a second standard insert from the second standard insert space, wherein the second standard insert space defines a second width,
   removing the second vertical divider to define a first non-standard insert space between the first and third vertical dividers, wherein the first non-standard insert space defines a third width, wherein the third width is equal to the first width plus the second width plus the thickness of the second vertical divider,
   inserting a first non-standard insert into the first non-standard insert space,
   wherein the first standard insert is a first standard electrical insert that includes a first standard insert electrical connector that connects to a first monument electrical connector,
   wherein the second standard insert is a second standard electrical insert that includes a second standard insert electrical connector that connects to a second monument electrical connector,
   wherein the first non-standard insert is a first non-standard electrical insert that includes a first non-standard insert electrical connector that connects to one of the first or second monument electrical connectors.

2. The method of claim 1 wherein the first standard insert includes a first volume, wherein the second standard insert includes a second volume, wherein the first non-standard insert includes a third volume, wherein the third volume is greater than the first volume plus the second volume.

3. The method of claim 2 wherein the first standard insert is a first oven, wherein the second standard insert is a second oven, and wherein the first non-standard insert is a third oven.

4. The method of claim 1 further comprising the steps of:
   removing the first non-standard insert from the first non-standard insert space,
   inserting the second vertical divider between the first vertical divider and the third vertical divider to redefine the first and second standard insert spaces,
   inserting the first standard insert into the first standard insert space, and
   inserting the second standard insert into the second standard insert space.

5. The method of claim 1 wherein the first width and the second width are the same.

6. A method comprising the steps of:
   removing a first galley monument assembly from an aircraft interior, the first galley monument assembly including a first outer wall and at least first and second standard insert spaces, wherein the first standard insert space is defined between a first vertical divider and a second vertical divider, wherein the second standard insert space is defined between the second vertical divider and a third vertical divider, wherein the first standard insert space defines a first width, and wherein the second standard insert space defines a second width, wherein each of the first and the second standard insert space satisfy size requirements mentioned in ARINC standards, replacing the first galley monument assembly with a second galley monument assembly that includes a second outer wall and at least a first non-standard insert space, wherein the first outer wall and the second outer wall have the same dimensions, wherein the first non-standard insert space is defined in the second galley monument in the same location as the first and second standard insert spaces in the first galley monument, and inserting a first non-standard insert into the first non-standard insert space, wherein the first standard insert space includes a first standard insert electrical connector that connects to a first monument electrical connector, wherein the second standard insert space includes a second standard insert electrical connector that connects to a second monument electrical connector, wherein the first non-standard insert space includes a first non-standard insert electrical connector that connects to one of the first or second monument electrical connectors.

7. The method of claim 6 wherein the first non-standard insert space defines a third width, wherein the second vertical divider has a thickness, wherein the third width is equal to the first width plus the second width plus the thickness of the second vertical divider.

8. The method of claim 6 wherein the first standard insert includes a first volume, wherein the second standard insert includes a second volume, wherein the first non-standard insert includes a third volume, wherein the third volume is greater than a sum of the first volume and the second volume.

9. The method of claim 6 wherein the second galley monument assembly has less monument electrical connectors than the first galley monument assembly.

* * * * *